(12) United States Patent
Segaram

(10) Patent No.: US 7,039,118 B1
(45) Date of Patent: *May 2, 2006

(54) HIGH SPEED COMMUNICATION SYSTEM WITH A FEEDBACK SYNCHRONIZATION LOOP

(75) Inventor: Para K. Segaram, Campbell, CA (US)

(73) Assignee: Rambus Inc., Los Altos, CA (US)

( * ) Notice: Subject to any disclaimer, the term of this patent is extended or adjusted under 35 U.S.C. 154(b) by 825 days.

This patent is subject to a terminal disclaimer.

(21) Appl. No.: 09/761,211

(22) Filed: Jan. 16, 2001

Related U.S. Application Data

(63) Continuation-in-part of application No. 09/372,319, filed on Aug. 11, 1999, now Pat. No. 6,775,328.

(51) Int. Cl.
*H04B 3/00* (2006.01)
*H04L 25/00* (2006.01)

(52) U.S. Cl. ........................ 375/257; 375/354
(58) Field of Classification Search ............... 375/257, 375/354, 355, 358, 373, 376
See application file for complete search history.

(56) References Cited

U.S. PATENT DOCUMENTS 4,617,423 A * 10/1986 Dickerson et al. .......... 178/2 R
5,742,798 A    4/1998 Goldrian
6,775,328 B1 *  8/2004 Segaram .................... 375/257

FOREIGN PATENT DOCUMENTS

JP        02000035831 A    2/2000

OTHER PUBLICATIONS

"Draft Standard for Low-Voltage Differential Signals (LVDS) for Scalable Coherent Interface (SCI)", Draft 1.3, IEEE P1596.3-1995, pp. i-viii, pp. 1-34 (Nov. 1995).
"Media Access Control (MAC) Parameters, Physical Layer, Repeater and Management Parameters for 1000 Mb/s Operation", IEEE Draft P802.3z/D5.0, pp. i-vi, pp. 01.1-01.8, 04.7-04.36, 05.1-05.6, 06.1-06.2, 22.1-22.10, 30.1-30.54, 30A,1-30A.44, 30B.1-30B.8, 31B.1-31B.2, 34.1-34,4, 35.1-35.30, 36.1-36.48, 36A.1-36A.4, 36B.1-36B.2, 37.1-37.26, 38.1-38.32, 39.1-39.20, 41.1-41.28, 42.1-42.8 (May 1998).

* cited by examiner

*Primary Examiner*—Kevin Burd
(74) *Attorney, Agent, or Firm*—Hunton & Williams LLP

(57) ABSTRACT

In a communications device having a physical layer device and a processing device connected to the physical layer device, the number of input/output (I/O) ports required for communication between the devices in the gigabit range is substantially reduced by utilizing millivolt differential I/O drivers and receivers. In addition, a calibration feedback loop synchronizes the data and clock signals on the processing device, thereby eliminating the need to recover the clock on the processing device.

20 Claims, 6 Drawing Sheets

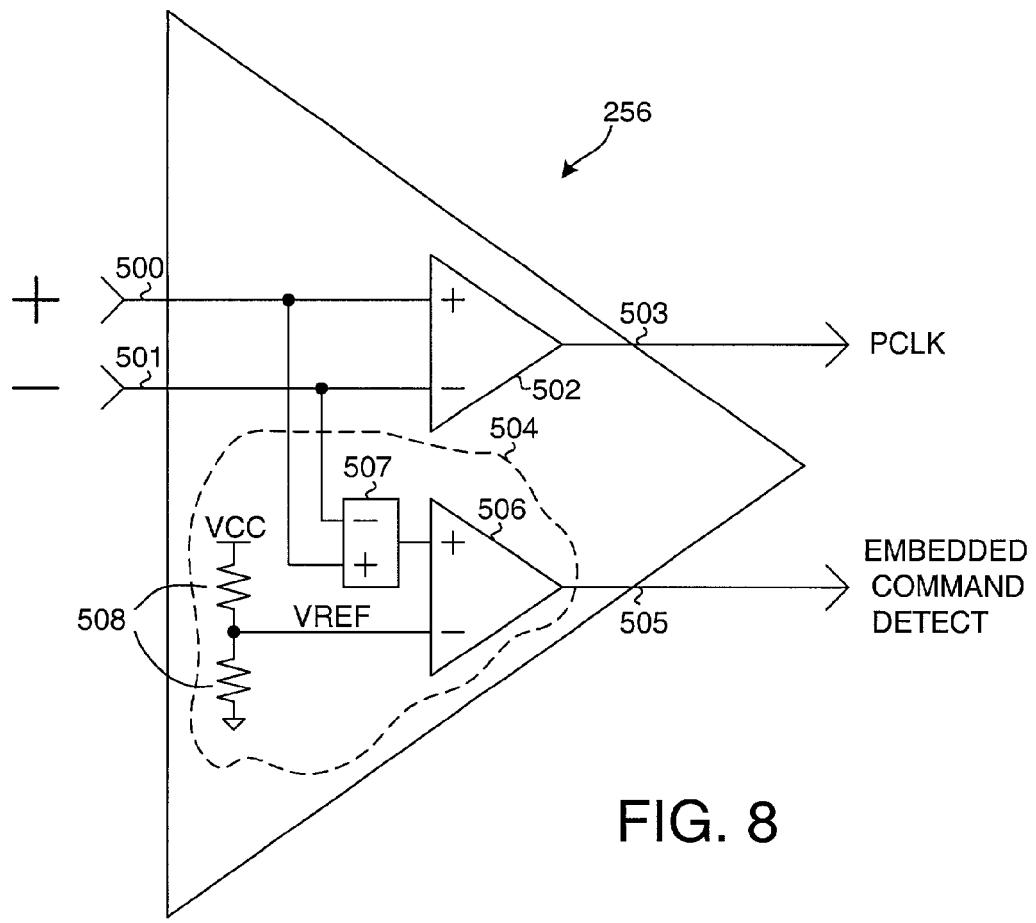
FIG. 8
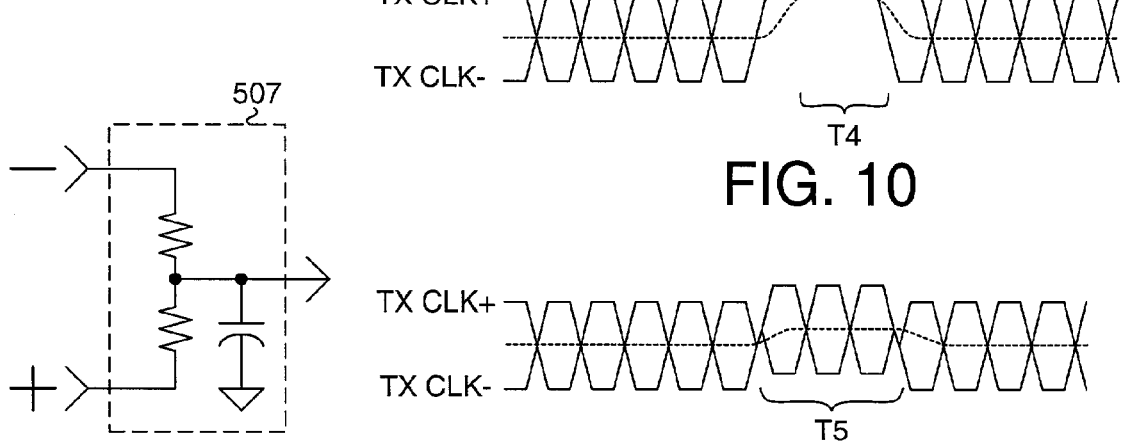
FIG. 9
FIG. 10
FIG. 11 ced data signal from 3.3V to 500 mV, the frequency of the
HIGH SPEED COMMUNICATION SYSTEM WITH A FEEDBACK SYNCHRONIZATION LOOP

CROSS-REFERENCE TO RELATED APPLICATION

This application is a continuation-in-part of application Ser. No. 09/372,319, filed Aug. 11, 1999. The entirety of application Ser. No. 09/372,319 as originally filed including its originally-filed claims is incorporated herein by reference.

FIELD OF THE INVENTION

The present invention relates to a high-speed communication system and, more particularly, to a high-speed communication system with a feedback synchronization loop.

DESCRIPTION OF THE RELATED ART

A gigabit communication system is a system that transfers billions of bits of data per second between the nodes of the system. Gigabit communication systems commonly handle the data transferred over the backplane of the internet, and are expected to handle the data transferred between next-generation processors and peripherals, such as hard drives and printers.

FIG. 1 shows a block diagram that illustrates a conventional gigabit communication system 100. As shown in FIG. 1, system 100 includes a high-speed transmission medium 108, such as a fiber optic cable, and a number of communication devices 110 that receives data from, and transmits data to, medium 108.

Each communication device 110, in turn, includes a physical layer device 112 that is connected to medium 108, and a processing device 114 that is connected to physical layer device 112 by a number of lines 116. Physical layer device 112 includes a serializer/deserializer (serdes) that transforms data received from medium 108 into a signal format that is compatible with processing device 114, and transforms data from processing device 114 into a signal format that is compatible with medium 108.

When transferring data to, and receiving data from, processing circuit 114, the serdes typically utilizes a data signal which has a logic high that is represented by a maximum voltage which is equal to the supply voltage used by the processing circuit.

For example, when device 114 is formed in a 0.35 micron photolithographic process, physical layer device 112 transmits data to, and receives data from, device 114 with data signals that have a maximum voltage of approximately 3.3V, the supply voltage commonly used with 0.35 micron devices.

One channel of data is typically transported across medium 108, and between physical layer device 112 and processing device 114, at 1.25 Gb/s, with speeds of 2.5 Gb/s under consideration. Processing device 114 processes the data received from medium 108 by physical layer device 112, and outputs processed data to physical layer device 112 for transmission onto medium 108.

Physical layer device 112 and processing device 114 are typically encapsulated in separate chips which are placed on the same printed circuit board due to the largely analog nature of device 112 and the largely digital nature of device 114. One consequence of this approach, however, is that electromagnetic interference (EMI) requirements limit the maximum speed that data can be exchanged between devices 112 and 114.

For example, when data is exchanged between devices 112 and 114 with data signals having a maximum voltage of approximately 3.3V, the maximum speed that can be obtained without exceeding the EMI requirements is approximately 125 Mb/s.

Thus, to handle one channel of inbound data, which is received at 1.25 Gb/s, 10 inbound lines 116 are required to transport data from device 112 to device 114, where physical layer device 112 has 10 output ports and processing device 114 has 10 input ports. (10 inbound lines 116 at 125 Mb/s provide one channel of inbound data at 1.25 Gb/s).

Similarly, processing device 114 requires 10 outbound lines 116 to transport one channel of outbound data from device 114 to device 112, where processing device 114 has 10 output ports and physical layer device 112 has 10 input ports. Thus, device 112 and 114 each require 20 input/output ports, with 20 corresponding pins, to handle the inbound and outbound data for one channel.

To provide additional EMI margin and greater chip-to-chip spacing, communication devices with reduced chip-to-chip speeds are also available. These reduced-speed devices typically transfer data between devices 112 and 114 at 62.5 Mb/s.

One problem with communication devices that have reduced chip-to-chip speeds, however, is that devices 112 and 114 have twice as many I/O ports and twice as many pins. Thus, with a reduced-speed device, devices 112 and 114 require 40 pins each (20 inbound lines 116 at 62.5 Mb/s are required to provide one input channel at 1.25 Gb/s, while 20 outbound lines 116 at 62.5 Mb/s are required to provide one outbound channel at 1.25 Gb/s).

The pin problem becomes even worse when devices 112 and 114 are packaged as four- and eight-channel devices. When packaged in this way, devices 112 and 114, when operating at a high chip-to-chip speed, i.e., 125 Mb/s, each require 80 pins and 160 pins to support four- and eight-channel devices, respectively. Further, devices 112 and 114, when operating at a slower chip-to-chip speed, i.e., 62.5 Mb/s, each require 160 pins and 320 pins to support four- and eight-channel devices, respectively.

The pin problem reaches critical stages when devices 112 and 114 are scaled up to handle a 2.5 Gb/s data rate from the current 1.25 Gb/s rate. At these higher speeds, devices 112 and 114, when operating at a high chip-to-chip speed, i.e., 125 Mb/s, require 160 pins and 320 pins to support four- and eight-channel devices, respectively. Further, devices 112 and 114, when operating at a slower chip-to-chip speed, i.e., 62.5 Mb/s, require 320 pins and 640 pins to support four- and eight-channel devices, respectively.

Thus, there is a great need to reduce the pin counts of devices 112 and 114 when devices 112 and 114 are scaled up to handle a 2.5 Gb/s data rate. (In addition to consuming huge amounts of silicon real estate, large pin count devices also consume large amounts of power.)

One conceptual approach to reducing the pin counts is to exchange data between devices 112 and 114 with a single-ended signal that has a lower maximum voltage. For example, by lowering the maximum voltage of a single-ended data signal from 3.3V to 500 mV, the frequency of the data signal can be increased from 125 Mb/s to approximately 1.25 Gb/s without exceeding the EMI requirements. By lowering the maximum voltage from 3.3V to 250 mV, the frequency of the data signal can be increased from 125 Mb/s to approximately 2.5 Gb/s without exceeding the EMI requirements.

One problem with this conceptual approach, however, is that it is extremely difficult, if not impossible, to form inbound detectors on processing device 114, and outbound detectors on device 112, that accurately detect logic ones and logic zeros from a single-ended gigahertz data signal that has a maximum voltage in the hundreds of millivolts due to the voltage margins required by the detectors.

Another problem with this conceptual approach is that much more complex clock recovery circuitry is required to recover a clock signal from a data signal operating in the gigahertz range, such as 2.6 GHz, than from a data signal operating in the megahertz range, such as 125 MHz. Thus, much of the clock recovery circuitry that is utilized in the serdes would also be required in processing device 114 to recover the clock from a gigahertz data signal (output by device 112 to device 114) that has a maximum voltage in the hundreds of millivolts.

Another approach to reducing the pin count, that also avoids this duplication, is to integrate the functions of physical layer device 112 and processing device 114 on a single chip. One problem with this approach, however, is the incompatibility of high-precision analog circuits, which make up most of the circuits on physical layer device 112, with digital circuits, which make up most of the circuits on processing device 114.

One of these incompatibilities is the speed with which new processing technologies can be implemented. For the present, digital circuits are easily adapted to new (and smaller) processing technologies because the voltage levels that represent logic ones in the new processing technologies are still easily distinguished from the voltage levels that represent logic zeros.

For example, in both a 0.5 micron photolithographic process and a 0.35 micron photolithographic process, where a logic one is represented by a 5V signal and a 3.3V signal, respectively, the logic one is easily distinguished from a logic zero which, in both cases, has a voltage near zero.

For high-precision analog circuits, however, moving from a 0.5 micron photolithographic process to a 0.35 micron photolithographic process, where the supply voltage drops from 5V to 3.3V, dramatically reduces, among other things, the dynamic ranges of the analog devices. Further design (and time) is then often needed to develop devices which operate in these ranges.

Thus, integrating the functions of physical layer device 112 and processing device 114 on a signal chip increases the time required for the digital circuitry in the integrated device to take advantage of the reduced size and power requirements provided by a new photolithographic process.

As a result, there is a need for a communication device that has a physical layer device and a processing device which operate in the gigahertz frequency range with substantially fewer pins.

SUMMARY OF THE INVENTION

In a communication device having a physical layer device and a processing device connected to the physical layer device, the pin counts of the physical layer device and the processing device are substantially reduced when operating with gigahertz signals by utilizing millivolt differential signals. In addition, a calibration feedback loop synchronizes the data and clock signals on the processing device, thereby eliminating the need for a gigahertz clock recovery circuit on the processing device. By eliminating the gigahertz clock recovery circuit (involving high speed analog circuitry) from the processing device and keeping the high speed analog circuitry on the physical layer device, the processing device with the more easily scalable digital circuitry can be scaled down to take advantage of smaller geometry processing technologies without having to redesign the high speed analog circuitry on the physical layer device.

A communications device in accordance with the present invention includes a physical layer device that has a media driver connectable to a transmission medium, a media receiver connectable to the transmission medium, and a serializer/deserializer (serdes) connected to the media driver and the media receiver. The physical layer device also includes a master circuit that is connected to the serdes. The master circuit has a first physical layer data driver that drives a millivolt differential signal, and a first physical layer data receiver.

The communications device further includes a processing circuit that has an internal circuit, and a slave circuit connected to the internal circuit and the master circuit. The slave circuit has a first processing data receiver connected to the first physical layer data driver. The first processing data receiver outputs a first signal in response to receiving the signal output from the first physical layer data driver. In addition, the slave circuit further includes a first processing data driver which is connected to the first physical layer data receiver, and connectable to the first processing data receiver.

In addition, the master circuit further includes a clock driver which is connected to the serdes and outputs a millivolt differential signal, and the slave circuit further includes a clock receiver connected to the clock driver. The clock receiver outputs a clock signal in response to a signal received from the clock driver.

Further, the first processing data driver is connectable to receive the clock signal from the clock receiver or the first signal from the first processing data receiver. The first physical layer data receiver receives the clock signal when the first processing data driver is connected to receive the clock signal, and receives the first signal when the first processing data driver is connected to receive the first signal.

The master circuit additionally includes an aligner that is connected to the first physical layer data receiver. The aligner receives the clock signal when the first physical layer data receiver receives the clock signal, and the first signal when the first physical layer data receiver receives the first signal. The aligner has phase comparison circuitry that compares the phase of the clock signal received by the aligner with the phase of the first signal received by the aligner to determine a phase difference.

The master circuit further includes a phase delay circuit that is connected to the aligner, the serdes, and the first physical layer data driver. The aligner passes a plurality of signals to the phase delay circuit that indicates the phase difference. The phase delay circuit delays the signal output from the first physical layer data driver so that the first signal received by the aligner is substantially in phase with the clock signal received by the aligner.

A better understanding of the features and advantages of the present invention will be obtained by reference to the following detailed description and accompanying drawings which set forth an illustrative embodiment in which the principles of the invention are utilized.

BRIEF DESCRIPTION OF THE DRAWINGS

FIG. 8 is a block diagram of the receiver of FIG. 2 in accordance with a particular embodiment of the present invention.

FIG. 9 is a circuit diagram of the filter of FIG. 8 in accordance with a particular embodiment of the present invention.

FIG. 10 is a simplified waveform diagram illustrating a technique for sending an embedded command using a clock signal in accordance with a particular embodiment of the present invention.

FIG. 11 is a simplified waveform diagram illustrating another technique for sending an embedded command using a clock signal in accordance with a particular embodiment of the present invention.

DETAILED DESCRIPTION

Figure 2:
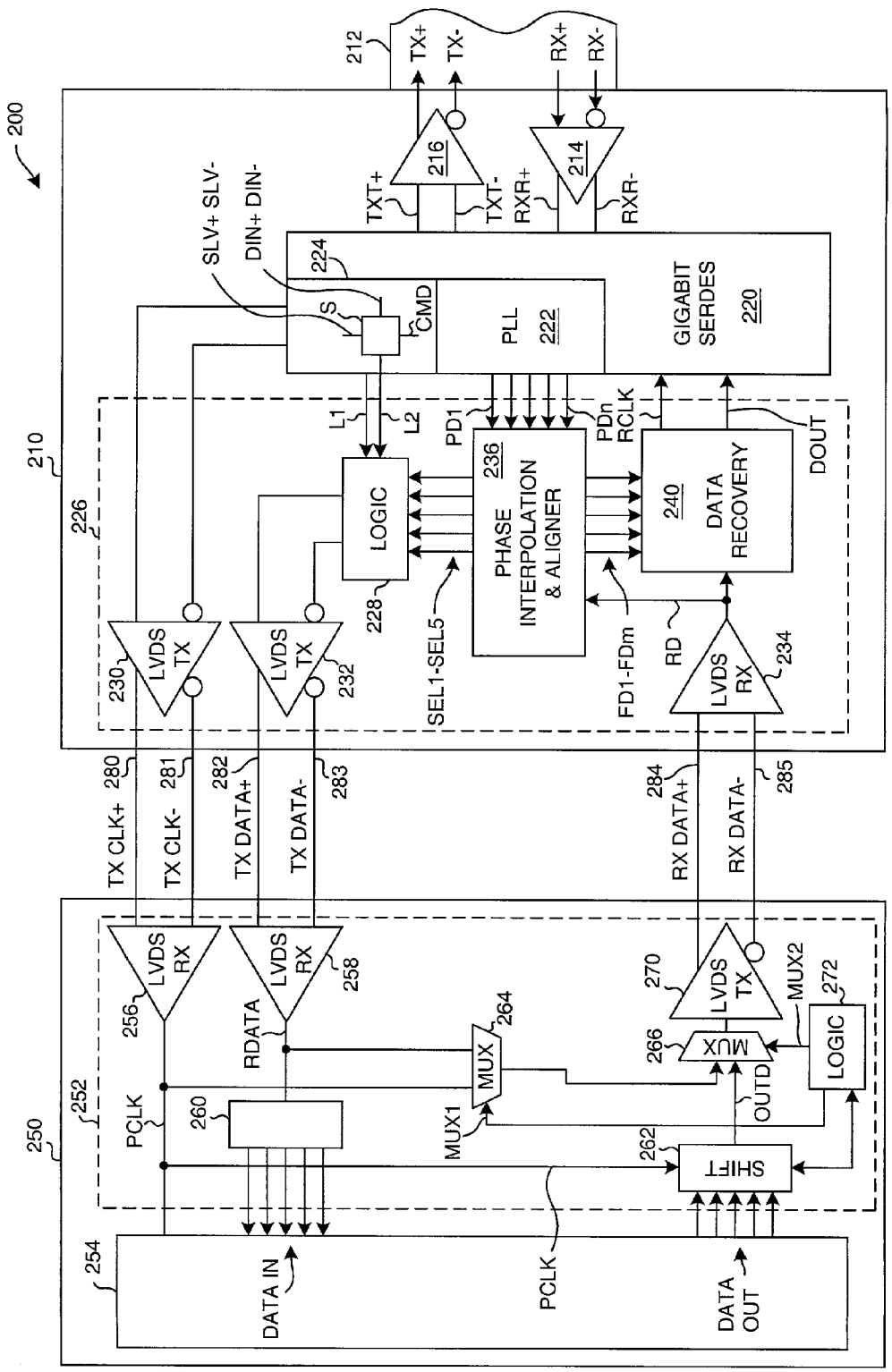
FIG. 2 is a block diagram illustrating a communication device 200 (a communication system involving physical layer device 210 and processing circuit 25) in accordance with the present invention.

FIG. 2 shows a block diagram that illustrates a communication device 200 in accordance with the present invention. As shown in FIG. 2, device 200 includes a physical layer device 210 and a processing circuit 250 that is connected to device 210. Device 210 receives information from, and transmits information to, a high-speed transmission medium 212, such as a fiber optic cable, while circuit 250 receives information from, and transmits information to, device 210. Device 200 is, in one embodiment, disposed on a line card of a router. The line card has a backplane connector for connecting to a backplane of the router. Processing circuit 250 communicates with the rest of the router via this backplane connector. The high-speed transmission medium 211 is one of many fiber optic cables by which router is coupled to the Internet.

Device 210 includes a low-voltage, differential receiver 214 that outputs a pair of differential data signals RXR+ and RXR– in response to receiving a pair of differential signals RX+ and RX– from medium 212, and a low-voltage, differential driver 216 that outputs a pair of differential data signals TX+ and TX– to medium 212 in response to receiving a pair of differential data signals TXT+ and TXT–.

Data is preferably received from, and transmitted to, medium 212 at either 1.25 Gb/s, 1.6 Gb/s, or 3.125 Gb/s. (The present invention is not limited to these frequencies, and may be used with other frequencies.)

Receiver 214 and driver 216 are preferably low-voltage PECL optical and short copper receivers and drivers, respectively. (The present invention is not limited to these drivers and receivers, and may be used with other drivers and receivers.)

In addition, device 210 also includes a gigabit serializer/deserializer (serdes) 220 that transforms the data signals RXR+ and RXR– into differential input data signals DIN+ and DIN–, and transforms an output data signal DOUT into the data signals TXT+ and TXT–. A switch S switchably connects the input data signals DIN+ and DIN– to lines L1 and L2 in response to a first logic state of a calibration command CMD.

Serdes 220 also includes a phase-locked-loop circuit 222 that outputs a base clock signal (not shown) having, for example, a frequency of 250 MHz, and a series of phase-delayed clock signals PD1–PDn which each have an equal phase delay. For example, each of five delayed clock signals can have a 72 degree phase shift (5*72=360).

Serdes 220 further includes a multiplier/switch circuit 224 that multiplies the frequency of the base clock signal to output a pair of differential master clock signals MCLK+ and MCLK–. The master clock signals MCLK+ and MCLK– are preferably output at either 1.25 Gb/s, 1.6 Gb/s, 1.6 Gb/s, 2.5 Gb/s, or 3.125 Gb/s. (The present invention is not limited to these frequencies, and may be used with other frequencies.)

In addition, circuit 224 also forms a pair of differential slave clock signals SLV+ and SLV– having the same frequency as the master clock signals MCLK+ and MCLK–. Switch S switchably connects the slave clock signals SLV+ and SLV– to lines L1 and L2 in response to a second logic state of the calibration command CMD so that the slave clock signals SLV+ and SLV– are output onto lines L1 and L2 instead of the data signals DIN+ and DIN–. Switch S therefore multiplexes either the data signals (DIN+ and DIN–) or the slave clock signals (SLV+ and SLV–) onto lines L1 and L2 depending on the value of CMD.

Serdes 220 is preferably implemented to comply with the IEEE 802.3z Gigabit Ethernet standard. (The present invention is not limited to the 802.3z Standard, and may be used with other standards.)

Device 210 further includes a master circuit 226 that is connected to serdes 220. Master circuit 226, in turn, includes a logic circuit 228 that outputs a pair of differential delayable signals DD+ and DD– in response to the signals on lines L1 and L2, and a series of select signals SEL1–SELs. Thus, when the input data signals DIN+ and DIN– are on lines L1 and L2, the delayable signals DD+ and DD– represent the input data signals DIN+ and DIN–; and when the slave clock signals SLV+ and SLV– are on lines L1 and L2, the delayable signals DD+ and DD– represent the slave signals SLV+ and SLV–.

Logic circuit 228 preferably provides a number of data paths that include a reference data path and a number of additional data paths that incrementally delay and/or advance the differential signals passing through circuit 228. The signals passing through circuit 228, in turn, follow the data path selected by the select signals SEL1–SELs. (The present invention is not limited to circuit 228, and may be used with other selectably delayable circuits.)

In addition, circuit 226 further includes a millivolt differential driver 230 that outputs (in response to the master clock signals MCLK+ and MCLK–) a pair of differential transmit clock signals TX CLK+ and TX CLK– onto lines 280 and 281, respectively. Circuit 226 also includes a millivolt differential driver 232 that outputs (in response to the delayable signals DD+ and DD−) a pair of differential transmit signals TX DATA+ and TX DATA− onto lines 282 and 283, respectively.

Thus, the transmit clock signals TX CLK+ and TX CLK− represent the master clock signals MCLK+ and MCLK−. In addition, the transmit signals TX DATA+ and TX DATA− represent the input data signals DIN+ and DIN− when the delayable signals DD+ and DD− represent the input data signals DIN+ and DIN−; and the slave clock signals SLV+ and SLV− when the delayable signals DD+ and DD− represent the slave clock signals SLV+ and SLV−.

Drivers 230 and 232 preferably output the transmit clock signals TX CLK+ and TX CLK− and the transmit signals TX DATA+ and TX DATA− at either 1.25 Gb/s, 1.6 Gb/s, 2.5 Gb/s, or 3.125 Gb/s. (The present invention is not limited to these frequencies, and may be used with other frequencies.) Thus, when the transmit signals TX DATA+ and TX DATA− represent the input data signals DIN+ and DIN−, data is output from device 210 at the same data rate that device 210 receives data from medium 212.

In addition, the transmit clock signals TX CLK+ and TX CLK− and the transmit signals TX DATA+ and TX DATA− are preferably defined by the TIA/EIA-644 Low Voltage Differential Signal (LVDS) Standard (which defines a 250 mV differential signal). (The present invention is not limited to the LVDS Standard, and may be used with other low-voltage standards.) One of the advantages of the present invention is that by using millivolt differential signals, the EMI problem encountered by conventional systems is effectively eliminated.

Circuit 226 additionally includes a millivolt differential data receiver 234 that outputs a receive signal RD in response to receiving a pair of differential transmit signals RX DATA+ and RX DATA−. Differential transmit signals RX DATA+ and RX DATA− are received from lines 284 and 285, respectively.

Further, circuit 226 also includes a phase interpolation and aligner circuit 236 that outputs a series of finer delayed signals FD1–FDm, each having the same frequency and an equal phase delay, in response to each phase delayed signal PD. For example, if phase delayed signal PD1 represents a 0 degree phase shift, phase delayed signal PD2 represents a 72 degree phase shift, and phase delayed signal PD3 represents a 144 degree phase shift, then 36 finer delayed signals each having a 2 degree phase shift are formed for signal PD1, i.e., 0 degree, 2 degrees, 4 degrees, . . . 70 degrees, while 36 finer delayed signals each having a 2 degree phase shift are formed for signal PD2, i.e., 72 degrees, 74 degrees, 76 degrees, . . . 142 degrees.

The resolution required by the system determines the number of finer delayed signals FD1–FDm that are used. For example, to have a one degree resolution rather than a two degree resolution, 72 finer delayed signals each having a one degree phase shift are formed for each of the phase delayed signals PD 1–PDn.

As described in greater detail below, circuit 236 also utilizes the finer delayed signals FD1–FDm to compare the phase of a first received signal RD received at a first time and the phase of a second received signal RD received at a later time, and outputs the select signals SEL1–SELs in response to the comparison such that the select signals SEL1–SELs define a difference between the phases of the signals.

Circuit 226 further includes a data recovery circuit 240 that outputs data signal DOUT and a recovered clock signal RCLK in response to the received signal RD and the finer delayed signals FD1–FDm.

As noted above and as further shown in FIG. 2, device 200 also includes processing circuit 250. Circuit 250, in turn, includes a slave circuit 252 and an internal circuit 254 that is connected to slave circuit 252. Slave circuit 252 includes a millivolt differential receiver 256 that outputs a processing clock signal PCLK in response to receiving the clock signals TX CLK+ and TX CLK−, and a millivolt differential receiver 258 that outputs a received signal RDATA in response to receiving the transmit signals TX DATA+ and TX DATA−.

Thus, processing clock signal PCLK represents the master clock signal MCLK+ and MCLK−. In addition, the received signal RDATA represents the input data signals DIN+ and DIN− when the transmit signals TX DATA+ and TX DATA− represent the input data signals DIN+ and DIN−; and the slave clock signals SLV+ and SLV− when the transmit signals TX DATA+ and TX DATA− represent the slave clock signals SLV+ and SLV−.

Circuit 252 also includes a first shift register 260 that converts the serial received signal RDATA into an input parallel data signal DATAIN in response to the processing clock signal PCLK. Internal circuit 254 receives the processing clock signal PCLK and the parallel data signal DATAIN.

The processing clock PCLK and the received signal RDATA have an equivalent path length to the first shift register 260 (or a known phase delay). In addition, the processing clock signal PCLK and the data signals DATAIN are CMOS (or otherwise) compatible, and directly interface, with internal circuit 254.

In addition, circuit 252 further includes a second shift register 262 that directly interfaces with internal circuit 254 to convert a parallel data signal DATAOUT from internal circuit 254 into a serial data signal OUTD. Second shift register 262 utilizes the processing clock signal PCLK to clock the parallel data signal DATAOUT out of shift register 262. Thus the data signal OUTD is synchronized to the processing clock signal PCLK.

Circuit 252 further includes a first multiplexor 264 that passes either the processing clock signal PCLK or the received signal RDATA in response to a first mux signal MUX1, and a second multiplexor 266 that passes either the processing clock signal PCLK or the received signal RDATA, or the data signal OUTD in response to a second mux signal MUX2. Further, the path lengths between receiver 256 and multiplexor 264, and between receiver 258 and multiplexor 264 are equal (or have a known phase difference).

In addition, circuit 252 includes a millivolt differential driver 270 that outputs the differential transmit signals RX DATA+ and RX DATA− in response to either the processing clock signal PCLK, the received signal RDATA, or the data signal OUTD, depending on which signal is passed by multiplexor 266.

Circuit 252 further includes a logic circuit 272 that receives the processing clock signal PCLK from shift register 262, and outputs mux signals MUX1 or MUX2 to multiplexors 264 and 266 (or outputs a fixed pattern, e.g., 1-0-1-0-1-0, to shift register 262) in response to commands embedded in the processing clock signal PCLK (by serdes 220). Embedding commands in the processing clock is described in additional detail below.

The transmit signals RX DATA+ and RX DATA− are preferably output at either 1.25 Gb/s, 1.6 Gb/s, 2.5 Gb/s, or 3.125 Gb/s. (The present invention is not limited to these frequencies, and may be used with other frequencies.) Thus, the transmit signals RX DATA+ and RX DATA− are output from circuit 250, received by device 210, and output by device 210 to medium 212 at the same data rate.

In addition, the data signals RX DATA+ and RX DATA− are also preferably defined by the TIA/EIA-644 Low Voltage Differential Signal (LVDS) Standard. (The present invention is not limited to the LVDS Standard, and may be used with other low-voltage differential signaling communication techniques.)

Thus, the received signal RD represents the data signal OUTD when the transmit 28 signals RX DATA+ and RX DATA− represent the data signal OUTD; the received signal RDATA when the transmit signals RX DATA+ and RX DATA− represent the received signal RDATA; and the processing clock signal PCLK, which represents the master clock signal MCLK+ and MCLK−, when the transmit signals RX DATA+ and RX DATA− represent the processing clock signal PCLK.

In addition, when the received signal RDATA represents the slave clock signals SLV+ and SLV−, the received signal RD represents the slave clock signals SLV+ and SLV−, and when the received signal RDATA represents the data signals DIN+ and DIN−, the received signal RD represents the signals DIN+ and DIN−.

Device 210 and circuit 250 are formed in separate packages, and may be formed on the same printed circuit board, or may be formed on separate circuit boards and connected via a back plane or bus. In addition, the frequency of the signal transmitted between the packages is a function of the distance that separates the packages.

Figure 1:
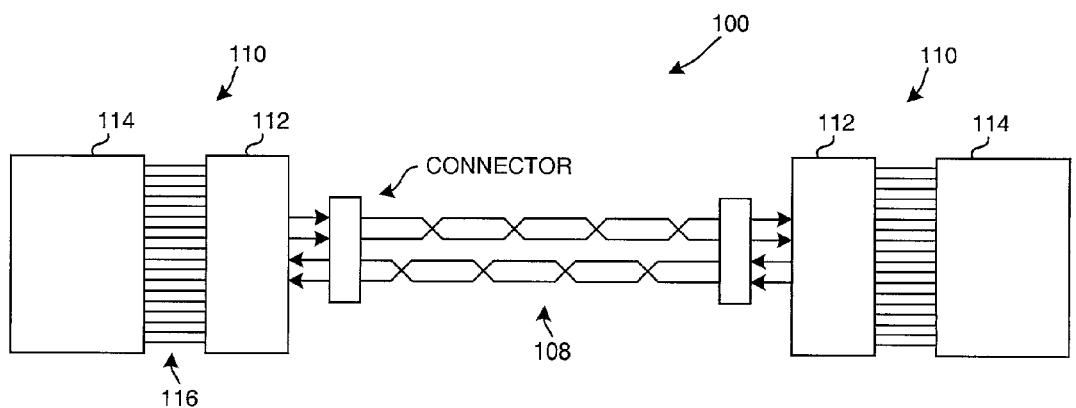
FIG. 1 is a block diagram illustrating a conventional gigabit communication system 100.
Figure 3:
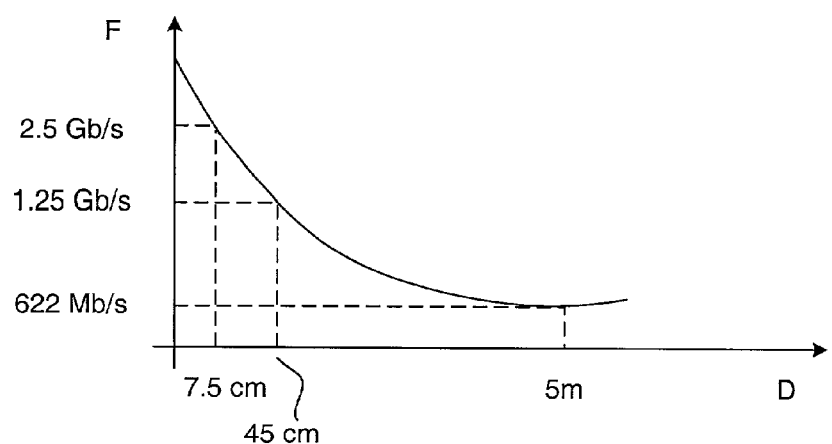
FIG. 3 is a graph illustrating the frequency F of the signal transmitted between the chips versus the distance D that separates the chips in accordance with the present invention.

FIG. 3 shows a graph that illustrates the frequency F of the signal transmitted between the chips versus the distance D that separates the chips. As shown in FIG. 3, if the chips are separated by 7.5 cm, the maximum frequency F of the signal is approximately 2.5 Gb/s; by 45 cm, the maximum frequency F of the signal is approximately 1.25 Gb/s; and by 5 meters, the maximum frequency F of the signal is approximately 622 Mb/s. Thus, one of the advantages of the present invention is that devices 112 and 114 can be further spaced apart, or placed on different circuit boards. In operation, device 210 and circuit 250 include a calibration mode and a normal operational mode. In the calibration mode, serdes 220 outputs the master clock signals MCLK+ and MCLK− with an embedded command at the frequency of data RX+ and RX−. In other words, the data and clock signals are at the same clock rate. As indicated above and described in additional detail below, commands may be embedded in the master clock signals.

The clock signals MCLK+ and MCLK− are driven by driver 230 as the clock signals TX CLK+ and TX CLK−. In response to the clock signals TX CLK+ and TX CLK−, receiver 256 outputs the processing clock signal PCLK to shift registers 260 and 262, and multiplexor 264.

The embedded clock command is passed through shift register 262 to logic circuit 272 which, in turn, sets the logic states of the MUX1 and MUX2 signals to pass the processing clock signal PCLK through multiplexors 264 and 266. The processing clock signal PCLK is then driven out of circuit 252 by driver 270 so that the transmit signals RX DATA+ and RX DATA− represent the processing clock signal PCLK.

Receiver 234 outputs the received signal RD, which represents processing clock signal PCLK, to aligner 236 in response to the transmit signals RX DATA+ and RX DATA−. Aligner 236 compares the phase of the received signal RD with the finer delayed signals FD1–FDm of each phase delayed signal PD, and identifies a finer delayed signal FD that is closest in phase with the received signal RD. Thus, since the received signal RD represents the processing clock signal PCLK which, in turn, represents the master clock signals MCLK+ and MCLK−, aligner 236 identifies a finer delayed signal FD that is closest in phase with the master clock signals MCLK+ and MCLK−.

In response to either a time out or a signal from aligner 236 that the phase of the master clock signals MCLK+ and MCLK− has been identified, serdes 220 changes the command embedded in the clock signals MCLK+ and MCLK−, and again outputs the clock signals MCLK+ and MCLK−. In addition, serdes 220 also switchingly connects the slave clock signals SLV+ and SLV− to lines L1 and L2.

The slave signals SLV+ and SLV− are passed through the reference data path and output as the delayable signals DD+ and DD− which, in turn, are driven by driver 232 as the transmit signals TX DATA+ and TX DATA−. In response to the transmit signals TX DATA+ and TX DATA−, receiver 258 outputs the received signal RDATA, representing the slave clock signals SLV+ and SLV−, which is presented to multiplexor 264.

As before, the clock signals MCLK+ and MCLK− are driven by driver 230 as the clock signals TX CLK+ and TX CLK−. In response to the clock signals TX CLK+ and TX CLK−, receiver 256 outputs the processing clock signal PCLK to shift registers 260 and 262, and multiplexor 264.

The embedded clock command is passed through shift register 262 to logic circuit 272 which, in turn, sets the logic states of the MUX1 and MUX2 signals to pass the received signal RDATA through multiplexors 264 and 266. The received signal RD is then driven out of circuit 252 by driver 270 as the transmit signals RX DATA+ and RX DATA−.

Receiver 234 outputs the received signal RD, which represents the slave clock signals SLV+ and SLV−, to aligner 236 in response to the transmit signals RX DATA+ and RX DATA−. Aligner 236 compares the phase of the received signal RD with the finer delayed signals FD1–FDm of each phase delayed signals PD, and identifies a finer delayed signal FD that is closest in phase with the received signal RD. Thus, since the received signal RD represents the slave clock signals SLV+ and SLV−, aligner 236 identifies a finer delayed signal FD that is closest in phase with the slave clock signals SLV+ and SLV−.

Aligner 236 compares the phase of the master clock signals MCLK+ and MCLK− and the slave clock signals SLV+ and SLV−. Based on the comparison, the aligner 236 outputs select signals SEL1–SELs which identify a synch data path from the additional data paths through logic circuit 228 such that, when the slave clock signals SLV+ and SLV− on lines L1 and L2 pass through the synch data path, the phase of the master clock signals MCLK+ and MCLK− and the phase of the slave clock signals SLV+ and SLV− are in phase when arriving at aligner 236. (The present invention is not limited to aligner 236, and may be used with other circuits which determine the difference in phase between the slave clock signals SLV+ and SLV− and the master clock signals MCLK+ and MCLK− to determine the appropriate select signals SEL1–SELs.)

Since the signal path for the signals that represent the master clock signals MCLK+ and MCLK− and the slave clock signals SLV+ and SLV− is the same from multiplexor 264 to aligner 236, the signals at the outputs of receivers 256 and 258 are also synchronized. Further, the processing clock signal PCLK at the input to internal circuit 254 and the parallel data signal DATAIN at the input to internal circuit 254 are also synchronized as the skew associated with first shift register 260 is negligible.

As noted above, device 210 and circuit 250 also include a normal operational mode. In the normal operational mode, multiplier/switch circuit 224 of serdes 220 outputs the clock signals MCLK+ and MCLK− with an embedded command at the frequency of data RX, and switchably connects the data signals DIN+ and DIN− to lines L1 and L2.

As a result, the received signal RDATA, which represents the input data signals DIN+ and DIN−, is synchronously provided to first shift register 260 with the processing clock signal PCLK. In addition, the embedded clock command is passed through shift register 262 to logic circuit 272 which, in turn, sets the logic state of the MUX2 signal to pass the data signal OUTD through multiplexor 266.

When working in the gigahertz range, simply providing equivalent path lengths for the clock and data signals passing through device 210 and circuit 250, which are formed in discrete packages, is insufficient to insure that the clock and data signals are synchronized. This is because differences between the bonding leads and bonding conductors of the discrete packages may unacceptably delay the clock signal with respect to the data signal, or vice versa.

The present invention overcomes this problem by providing two independent paths (for the clock and data signals) and one common feedback path. By synchronizing the signals at the end of the common path (at aligner 236), the signals at the beginning of the common path (at multiplexor 264) are also synchronized. By connecting the common path to the independent paths in the package that supports circuit 250, the problems caused by the differences between the bonding leads and bonding conductors of the discrete packages are eliminated.

The present invention provides a number of advantages over the prior art. In addition to eliminating the EMI problem as noted above, the present invention significantly reduces the pin count of the packages that hold device 210 and circuit 250.

In the present invention, device 210 requires six pins for transmission and reception with circuit 250, two each for drivers 230 and 232, and receiver 234. Similarly, circuit 250 requires six pins for transmission and reception with device 210, two each for receivers 256 and 258, and driver 270.

This compares with the 20 to 40 pins that are required per channel for each of the prior art packages for transmission and reception between device 210 and circuit 250. By substantially reducing the pin count, the present invention reduces the amount of silicon real estate required to implement device 210 and circuit 250 which, in turn, reduces the manufacturing costs and increases the manufacturing yield.

Another advantage is that, since device 210 and circuit 250 are formed in different packages, devices 210 and circuit 250 can be formed with different processing technologies. Digital circuit 250, including the analog elements in slave circuit 252, is easily scaled down with advances in processing technology, e.g., 0.25 micron to 0.18 micron technologies, since there are so few analog devices in slave circuit 252. Device 210, which is largely analog and more difficult to scale down, can continue to use existing processing technologies until newer processes have become proven.

A further advantage of the present invention is that by synchronizing the clock and data signals on the slave circuit 252, the need for a clock recovery circuit on the slave circuit 252 (to recover the clock from the data input from the physical layer device) is eliminated. This saves additional silicon real estate and simplifies the design of the slave circuit 252.

In accordance with an alternate embodiment of the present invention, a number of channels, such as four or eight, can be utilized in lieu of a single channel. In the alternate embodiment, each channel includes an inbound path having a line connected to serdes 220 and a logic circuit, a driver connected to the logic circuit, a receiver connectable to the driver, and a shift register connected to the receiver. Each channel further includes an outbound path having a shift register, a driver connectable to the shift register, a receiver connectable to the driver and connected to data recovery circuit 240.

Figure 4:
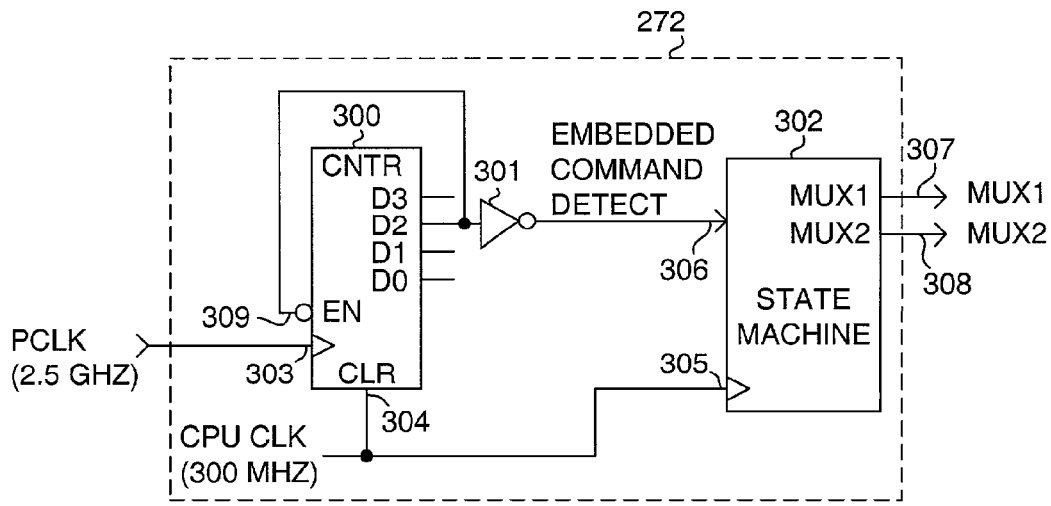
FIG. 4 is a block diagram of the logic circuit of FIG. 2 in accordance with a particular embodiment of the present invention.

FIG. 4 is a more detailed view of an example embodiment of the logic circuit 272. In this example, the logic circuit 272 includes a counter 300, an inverter 301 and a state machine 302. The incoming PCLK signal from the receiver 256 is supplied to a clock input lead 303 of the counter 300. The incoming PCLK signal is, in this example, a 2.5 GHZ clock signal.

The associated internal circuit 254 (as shown in FIG. 2) for this example includes digital circuitry and a digital processor (i.e., a CPU) that may be clocked by a lower frequency CPU CLK. The CPU CLK is supplied to an asynchronous clear input lead 304 of the counter 300. The CPU CLK is, in this example, a 300 MHz signal. The state machine 302 is clocked by the CPU CLK received on a clock input lead 305. The state machine 302 receives an embedded command detect signal on an input lead 306 and outputs multiplexor (mux) select signals MUX1 and MUX2 on output leads 307 and 308, respectively. The MUX1 signal is supplied to the select input lead of the multiplexor 264 as shown in FIG. 2 such that it controls which of the inputs of the multiplexor 264 is passed to the multiplexor 266. The MUX2 signal is supplied to the select input lead of the multiplexor 266 as shown in FIG. 2 such that it control which of the inputs (OUTD or the signal received from multiplexor 264) is passed to the driver 270. Thus, these multiplexor control signals determine if output data (OUTD) or one of the input signals received by the receivers 256 and 258 is forwarded to the receiver 234 of the communication device 200.

In normal operation, the clock signals TX CLK+ and TX CLK− on lines 280 and 281 are clocking at the 2.5 GHZ frequency. In order to put the processing circuit 250 into calibration mode, the physical layer device 210 sends an embedded command over lines 280 and 281. The embedding of a command may be accomplished by stopping the clocking of clock signals TX CLK+ and TX CLK− for a predetermined period of time. The logic circuit 272 (or another embedded command detection circuit included in the slave) detects this lack of clocking of PCLK as an embedded command.

Figure 5:
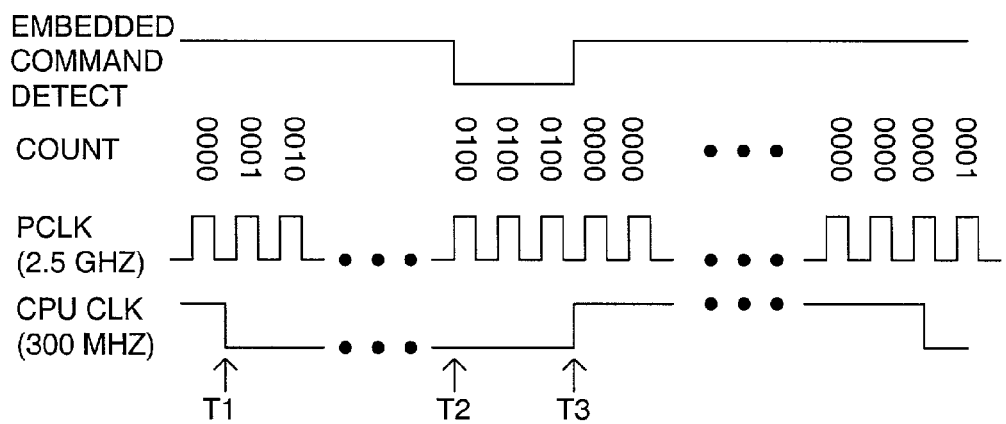
FIG. 5 is a simplified waveform diagram of an operation of the logic circuit of FIG. 4 when no embedded command is being detected.
Figure 6:
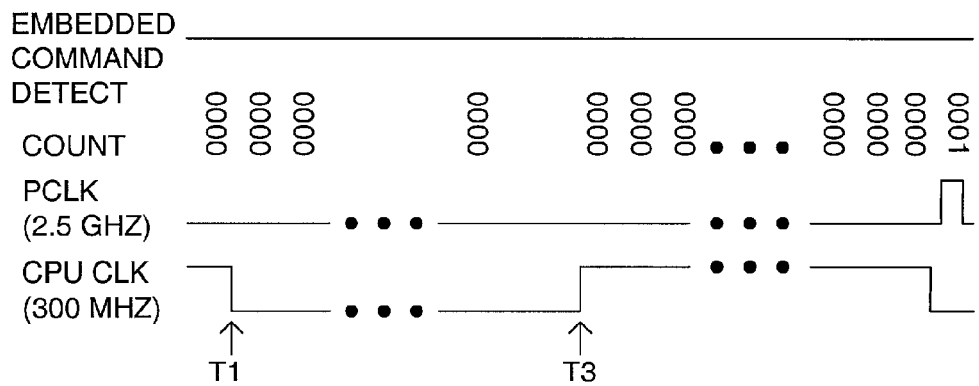
FIG. 6 is a simplified waveform diagram of an operation of the logic circuit of FIG. 4 when an embedded command is being detected.

In one example, a counter can be used in conjunction with the PCLK signal to determine if enough pulses exist on the PCLK signal within a predetermined amount of time. If a threshold number of pulses is not seen during the predetermined amount of time, then it may be determined that an embedded command has been received. FIGS. 5 and 6 illustrate timing diagrams associated with example operations of such a system.

FIG. 5 illustrates the timing waveforms associated with normal operations where an embedded command is not included in the PCLK signal. The bottom waveform, CPU CLK, represents the clock supplied to the clear input lead 304 of the counter 300. The counter 300 is held in a cleared state (outputs a four-bit value of 0000 for the specific example provided) while the clock signal CPU CLK is high.

When the CPU CLK drops low at time T1, the counter 300 starts counting rising edge transitions of PCLK. This counting is illustrated in FIG. 5 as a row of increasing four-bit values labeled "COUNT". D0 is the least significant bit on counter 300 and corresponds to the top most bit illustrated in this example. When the counter 300 counts enough rising CPU CLK transitions such that the D2 bit of the counter 300 transitions high (i.e. the counter 300 reaches the count value of four), then the counter 300 is disabled via the active low count enable input lead 309 of the counter 300. This is illustrated in FIG. 5 at time T2 where the count is halted at count 0100.

The inverter 301 inverts the value of bit D2 and supplies the resulting "embedded command detect" signal to the input lead 306 of the state machine 302. During normal operation (when an embedded command is not included in the PCLK signal), enough pulses of the PCLK signal are received such that the threshold count is reached. As such, the embedded command detect signal transitions low (i.e., no embedded command was detected) before the state machine 302 clocks in the state of the "embedded command detect" signal on the rising edge of CPU CLK at time T3.

FIG. 6 illustrates timing waveforms corresponding to a situation in which the logic circuit 272 (or another embedded command detection circuit) detects that the PCLK signal is not transitioning and, as a result, outputs an active high "embedded command detect" signal. In the case of FIG. 6, although the counter 300 is enabled for counting when CPU CLK transitions low at time T1, the counter 300 does not count any rising edges of PLK. This is because the clock signals TX CLK+ and TX CLK− are kept from toggling in order to communicate the embedded command. Accordingly, the counter output bit D2 does not transition high and the embedded command detect signal remains high. Based on the transition of CPU CLK at time T3, the state machine 300 reads in the high state of the embedded command detect signal (i.e. an embedded command is detected).

Figure 7:
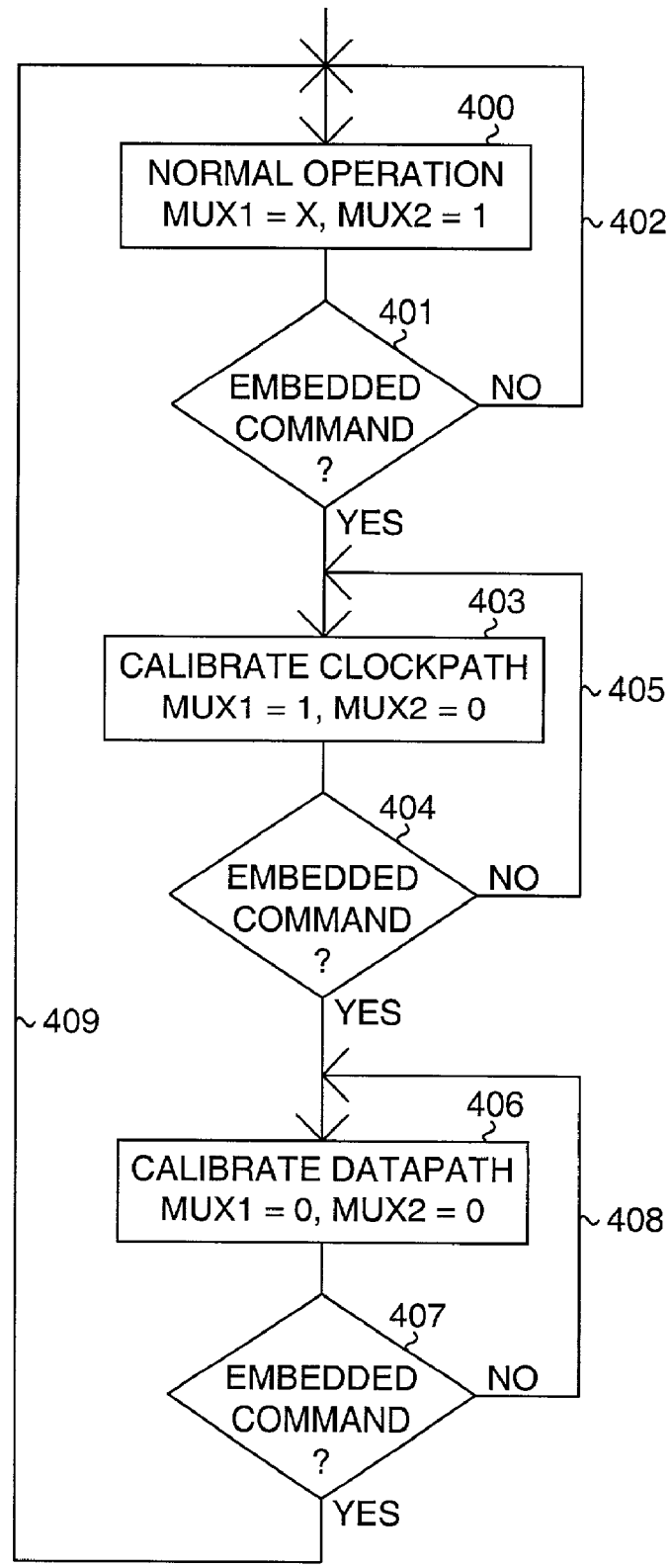
FIG. 7 is a flowchart that illustrates a method of operation of the logic circuit of FIG. 4.

FIG. 7 includes a flow chart that illustrates an operation of the state machine 300. The state machine 300 starts in a normal operation mode state (step 400). In the normal operation mode, the multiplexor 266 supplies the data output from shift register 262 to output driver 270 such that data is transmitted over lines 284 and 285 to physical layer device 210. Accordingly, the multiplexor select signal MUX2 supplied to multiplexor 266 is driven such that the multiplexor 266 provides the data output OUTD to the input of the driver 270. In the example illustrated in FIG. 7, a high value or logic "1" on the MUX2 select signal is assumed to properly configure the multiplexor 266 to provide OUTD at its output.

During normal operation, the signal selection performed by the multiplexor 264 is inconsequential, as the output of the multiplexor 264 is not selected by the multiplexor 266. As such, the value driven on the control signal MUX1 is a "don't care", which is represented by an "X" in FIG. 7.

At step 401, the state machine 302 determines if an embedded command has been detected. In the example of FIG. 4, this is communicated to the state machine 302 on the rising edge of the CPU CLK signal. As long as the clock signal PCLK is clocking at the 2.5 GHZ rate, an embedded command detect signal is not detected and the state machine 302 remains in the normal operation mode. This is illustrated in FIG. 7 by process flow 402. If the PCLK signal stops clocking for a predetermined period of time, the state machine 302 detects an embedded command detect signal and proceeds to step 403.

At step 403, the master clock signal (MCLK+ and MCLK−) is selected as a feedback signal to be provided back to the physical layer device 210. In the example illustrated in FIG. 2, the master clock signal propagates across lines 280 and 281, through the multiplexors 264 and 266, and back across lines 284 and 285. For simplicity of discussion, this path is referred to as the master clock feedback path. For the example illustrated, in order to configure the multiplexors to select the master clock signal as the feedback signal, the multiplexor select signals MUX1 and MUX2 values are set to "1" and "0" values, respectively. The phase of the master clock signal after transmission along the feedback path is then measured within the physical layer device 210. Such measurement may be referred to as calibration of the clock path as the lines 280 and 281 carry a clock signal during normal operation.

At step 404, the state machine 302 determines if another embedded command detect signal is received. If not, the method returns (via process flow 405) to step 403 and the system remains configured to support the master clock feedback path. In one embodiment, the subsequent embedded command detect signal is sourced by the physical layer device 210 once the successful measurement of the phase of the master clock signal received over the master clock feedback path is achieved.

If another embedded command detect signal is detected at step 404, the method proceeds to step 406. At step 406, the multiplexors 264 and 266 are configured such that the slave clock signal (made up of SLV+ and SLV−) is routed back to physical layer device 210 as the feedback signal. In the example illustrated in FIG. 2, the slave clock signal propagates across lines 282 and 283, through the multiplexors 264 and 266, and back across lines 284 and 285. For simplicity of discussion, this path is referred to as the slave clock feedback path.

For the example illustrated, in order to configure the multiplexors to select the master clock signal as the feedback signal, the multiplexor select signals MUX1 and MUX2 values are set to "0" and "0" values, respectively. The phase of the slave clock signal after transmission along the slave clock feedback path is then measured within the physical layer device 210 and compared with the phase of the master clock signal after transmission along the master clock feedback path. Based on this comparison, the delay of the logic block 228 is varied until the phase of the slave clock transmitted across the slave clock feedback path has a desired phase relationship with the master clock signal as transmitted across the master clock feedback path. In some embodiments, this may require aligning the phases of the two signals, whereas in other embodiments a desired phase offset (e.g. in degrees or time units) may be desired. This calibration operation may be referred to as calibrating the data path as the lines 282 and 283 typically carry data during normal operation.

Generally, the only difference between the master clock feedback path and the slave clock feedback path is that the master clock feedback path includes lines 280 and 281 and their corresponding driver and receiver, while the slave clock feedback path includes lines 282 and 283 and their corresponding driver and receiver. As such, the phase calibration performed using the feedback paths can be used to establish a known phase relationship for the signals transmitted across these components, thus allowing data—signals sent across lines 282 and 283 to be properly phase aligned with clock signals sent across lines 280 and 281. This allows the data signals to be captured within the slave circuit 252 without the need for complex clock recovery circuitry within the slave circuit 252.

Once the calibration of the data path is completed at step 406, another embedded command may be used to return the state machine to normal operation at step 400. This additional embedded command may be detected at step 407. If the additional embedded command is not detected at step 407, the state machine returns to step 406 via process flow 408.

In other embodiments, the transitions from step 403 to step 406 and from step 406 to step 400 may be controlled based on the expiration of a predetermined time delay rather than receipt of additional embedded commands. For example, the state machine may transition from normal operation to the clock path calibration step based on an embedded command received and then transition to the calibrate data path state after a predetermined time period during which the phase of the master clock signal is generally assured of being measured. As is apparent to one of ordinary skill in the art, a longer time period may be required to perform the data path calibration at step 406 such that the time period spent at step 406 is greater than that spent at step 403.

FIG. 8 is a diagram of one example of a receiver 256 that includes circuitry for detecting embedded commands that are communicated by an alteration of the common mode voltage of a received differential signal. In such an embodiment, the clock signals TX CLK+ and TX CLK− on input leads 500 and 501 have a common mode voltage within a particular voltage range during normal operation. For example, in the case where the voltage of each of signals TX CLK+ and TX CLK− ranges between VCC and VCC minus 250 millivolts, the signals TX CLK+ and TX CLK− are controlled such that the average voltage of TX CLK+ and TX CLK− over time (common mode voltage) is within some specified range (for example, VCC minus 125 millivolts plus or minus ten percent).

In order to communicate a command to the slave circuit 252, the physical layer device 210 generates an embedded command using the signals on lines 280 and 281 by shifting the common mode voltage outside the specified range. A state machine similar to state machine 300 described above can be used in association with the receiver 256 depicted in FIG. 8. Such a state machine would utilize the embedded command detect signal produced on output 505 to determine when to perform certain state transitions (and other state transitions may be based on the expiration of a predetermined time period as described above). The state machine 300 operates in accordance with the process flow of FIG. 7 as described above, but rather than receiving and "embedded command detect" signal from a counter such as counter 300, the "embedded command detect" signal is received from receiver 256 of FIG. 8 (in this case via shift register 262).

The receiver 256 illustrated in FIG. 8 includes a first comparator 502 that utilizes the differential signal received on input leads 500 and 501 to generate the clock signal PCLK on output lead 503. As shown, the receiver 256 also includes a common mode detect circuit 504 that generates the embedded command detect signal on lead 505.

The common mode detect circuit 504 detects when the common mode voltage corresponding to the differential signal received over leads 500 and 501 exceeds a specified voltage VREF. In a particular embodiment, VREF may be approximately VCC minus 125 millivolts plus 12 millivolts. Thus, if the common mode voltage is raised 12 millivolts above its normal level, an embedded command is detected. As is apparent to one of ordinary skill in the art, the value of VREF may be adjusted based on the particular characteristics (voltage level, timing, etc.) of the differential signal over which the embedded command is being carried.

The common mode detect circuit 504 includes a second comparator 506, a DC filter (i.e., low pass filter) 507, and a voltage divider 508n that is used to generate VREF. FIG. 9 is a circuit diagram of one example of a filter 507 that may be used to determine the common mode voltage of the differential signal received over lines 500 and 501. As is apparent to one of ordinary skill in the art, the polarity of the inputs to the comparator 506 may be reversed such that the embedded command is detected when the voltage on the common mode voltage falls below a predetermined VREF threshold. In some embodiments, the embedded command detect signal on lead 505 may be latched or edge triggered to ensure that it is properly provided to the state machine that controls the multiplexors 264 and 266.

FIG. 10 illustrates one technique that may be used by the physical layer device 210 to transmit an embedded command. In this case, the signals TX CLK+ and TX CLK− that are carried over the lines 280 and 281 are held high for a period of time (T4) sufficient for the receiver 256 to detect the elevated common mode voltage (designated by a dashed line).

FIG. 11 illustrates another way that the physical layer device 210 may transmit an embedded command. In this case, the voltage levels of each of the signals making up the differential signal are increased by a predetermined shift voltage for a period of time (T5) sufficient for receiver 256 to detect the reduced common mode voltage (designated by a dashed line). The magnitude of the predetermined shift voltage is determined based on the reference voltage VREF. The direction of the shift, which is upwards in the example illustrated such that the common mode voltage is increased, may be determined by whether the receiver 256 is configured to detect a common mode voltage that exceeds a predetermined higher threshold level, falls below a predetermined lower threshold level, or both.

Figure 12:
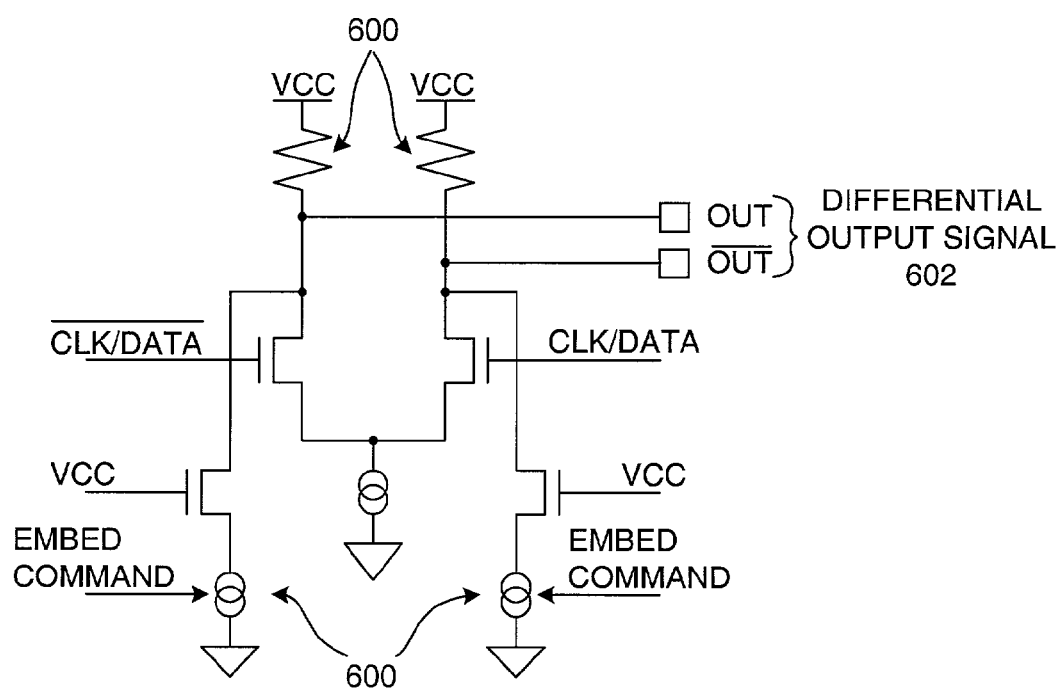
FIG. 12 is a simplified circuit diagram of a differential driver for sending an embedded in accordance with a particular embodiment of the present invention.

FIG. 12 is a simplified diagram of a driver 230 that may be used in a system that includes a receiver similar to that depicted in FIG. 8. In this circuit, additional current sources 600 are turned on to increase the drop across the load resistors 601 and therefore reduce the DC common mode voltage on the differential output signal 602. In other cases, the current sources that are normally turned on may be turned off in order to reduce the voltage drop across the load resistors and therefore increase the common mode voltage on the differential output signal 602.

Although the embedded command is described being sent across the TX CLK+ and TX CLK− lines 280 and 281, it is to be understood that in other embodiments an embedded command may be sent using the TX DATA+ and TX DATA− lines 282 and 283. In such embodiments, the receiver 258 would include the common mode voltage deviation detection circuitry described with respect to FIGS. 8–11 above.

In one embodiment, both the driver 232 and the driver 230 have the structure of FIG. 12. In such an embodiment, an embedded command may be communicated over lines 280 and 281 for phase detection of the clock feedback path, whereas another embedded command is communicated over lines 282 and 283 for phase detection/calibration of the data feedback path. In order to detect the common mode shift that signifies an embedded command, the receivers 256 and 258 may include analog circuitry, such as that described with respect to FIG. 8 above, adapted for such common mode shift detection.

Other techniques for conveying commands to the slave circuit 252 rely on the particular data protocol utilized. For example, in normal operation, data may be transmitted over lines 282 and 283 in accordance with one of many communication protocols. In a Gigabit Ethernet 803.2z communication device, for example, data values are converted into symbols that require additional bits of encoding. Such encoding techniques are used for a variety of reasons, including prevention of base line wander, simplification of receiver circuitry, etc. In one example, an eight-bit data value may be encoded to produce a ten-bit symbol (8B/10B encoding) that is transmitted. Once received, a 10B/8B decoder is used to convert the symbols back into the data values. Only certain symbols are considered valid for the transmission of data values, and the remaining symbols may be either unused or used for the communication of control information.

In accordance with one embodiment of the present invention, the physical layer device 210 transmits an embedded command to the processing circuit 250 by using a predetermined encoded symbol or sequence of symbols. The decoder in the processing circuit 250 can detect such symbols and indicate that an embedded command has been detected. This can then be used to control a state machine similar to that illustrated in FIG. 4. In other cases, different symbols or sequences represent different commands corresponding to different desired results (i.e. one command configures the data feedback path, another configures the clock feedback path, and another indicates normal operation).

Although the physical layer device 210 controls the processing circuit 250 in the examples above using an embedded command, it is to be understood that the command need not be embedded. Thus, in some embodiments, one or more dedicated signal lines or an additional communication signal or bus may be used to relay one or more different commands to the processing circuit 250.

The phase-matching calibration process described above need not necessarily be initiated by the physical layer device 210 sending a command to the processing circuit 250. For example, the processing circuit 250 may automatically enter the calibration mode after power-up. The processing circuit 250 can switch the feedback path from the clock feedback path to the data feedback path in response to receiving a command as described above, or alternatively can automatically switch the feedback path after a certain period of time.

In one embodiment, the calibration mode is entered in response to detecting a particular condition. For example, if the processing circuit 250 detects a bit error rate above a particular value (e.g., checksums associated with the data indicate a threshold number of errors in the data transmission from the physical layer device 210 to processing circuit 250), then the processing circuit 250 may signal the physical layer device 210 of the need to perform a calibration. The physical layer device 210 then initiates and/or controls the phase calibration process described above such that the bit error rate is reduced to an acceptable level.

In another embodiment, the physical layer device 210 carries out the phase calibration process periodically in accordance with a predetermined schedule. Accordingly, the described phase calibration process may be executed in response to numerous different conditions and can be initiated and controlled in many different ways. Additionally, the signals passing between physical layer device 210 and processing circuit 250 may, in some embodiments, be single-ended signals rather than differential signals.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A communication device comprising:
a physical layer device having:
a media driver connectable to a transmission medium;
a media receiver connectable to the transmission medium; and
a serializer/deserializer (serdes) connected to the media driver and the media receiver;
a master circuit connected to the serdes, the master circuit having:
a first physical layer data driver, the first physical layer data driver driving a millivolt differential signal; and
a first physical layer data receiver; and
a processing circuit having:
an internal circuit; and
a slave circuit connected to the internal circuit and the master circuit, the slave circuit having:
a first processing data receiver connected to the first physical layer data driver, the first processing data receiver outputting a first signal in response to receiving the signal output from the first physical layer data driver; and
a first processing data driver connected to the first physical layer data receiver, and connectable to the first processing data receiver.

2. The device of claim 1,
wherein the master circuit further includes a clock driver connected to the serdes, the clock driver driving a millivolt differential signal;
wherein the slave circuit further includes a clock receiver connected to the clock driver, the clock receiver outputting a clock signal in response to a signal received from the clock driver; and
wherein the first processing data driver is connectable to receive the clock signal from the clock receiver or the first signal from the first processing data receiver, the first physical layer data receiver receiving the clock signal when the first processing data driver is connected to receive the clock signal, and the first signal when the first processing data driver is connected to receive the first signal.

3. The device of claim 2 wherein the master circuit further comprises an aligner connected to the first physical layer data receiver, the aligner receiving the clock signal when the first physical layer data receiver receives the clock signal, the aligner receiving the first signal when the first physical layer data receiver receives the first signal, the aligner having phase comparison circuitry that compares a phase of the clock signal received by the aligner with a phase of the first signal received by the aligner to determine a phase difference.

4. The device of claim 3 wherein the master circuit further comprises a phase delay circuit connected to the aligner, the serdes, and the first physical layer data driver, the aligner passing a plurality of signal to the phase delay circuit that indicates the phase difference, the phase delay circuit delaying the signal output from the first physical layer data driver so that the first signal received by the aligner is substantially in phase with the clock signal received by the aligner.

5. The device of claim 4 wherein the slave circuit further includes:
   a first multiplexor connected to the clock input receiver and the first processing data receiver, the first multiplexor passing the clock signal output by the clock receiver when a first mux signal is in a first logic state, and passing the first signal output by the first processing data receiver when the first mux signal is in a second logic state; and
   a second multiplexor connected to the first multiplexor and the first communication data driver, the second multliplexor passing a signal output from the first multiplexor when a second mux signal is in a first logic state, and passing an output data signal when the second mux signal is in a second logic state, the signal output from the first multiplexor being the clock signal when the first mux signal is in the first logic state, and being the first signal when the first mux signal is in the second logic state.

6. The device of claim 5 wherein the slave circuit further includes a serial-to-parallel shift register connected to the clock receiver, the first processing data receiver, and the internal circuit, the clock signal output by the clock receiver clocking the shift register.

7. The device of claim 5 wherein the slave circuit further includes a parallel-to-serial shift register connected to the internal circuit, the second multiplexor, and the clock receiver, the shift register outputting a data output signal in response to a parallel data signal from the internal circuit, the clock signal output by the clock receiver clocking the parallel-to-serial shift register.

8. The device of claim 7 wherein the slave circuit further includes a logic circuit connected to the first mux, the second mux, and the parallel-to-serial shift register, the logic circuit receiving the clock signal from the parallel-to-serial shift register, and setting the logic states of the first and second mux signals in response to commands extracted from the clock signal.

9. The device of claim 8 wherein the media receiver receives a signal from the transmission media having a first frequency, wherein the signal output from the serdes has a second frequency, and wherein the first frequency and the second frequency are substantially equivalent.

10. A processing circuit comprising:
    an internal circuit; and
    a slave circuit connected to the internal circuit, the slave circuit having:
       a clock receiver connectable to a clock driver, the clock receiver outputting a clock signal in response to a millivolt differential signal received from the clock driver;
       a first processing data receiver connectable to a first physical layer data driver, the first processing data receiver outputting a first signal in response to a millivolt differential signal received from the first physical layer data driver;
       a first processing data driver connectable to a first physical layer data receiver, the first processing data driver being connectable to receive the clock signal from the clock receiver or the first signal from the first processing data receiver.

11. The circuit of claim 10 wherein the slave circuit further comprises:
    a first multiplexor connected to the clock input receiver and the first processing data receiver, the first multiplexor passing the clock signal output by the clock receiver when a first mux signal is in a first logic state, and passing the first signal output by the first processing data receiver when the first mux signal is in a second logic state; and
    a second multiplexor connected to the first multiplexor and the first communication data driver, the second miltiplexor passing a signal output from the first multiplexor when a second mux signal is in a first logic state, and passing an output data signal when the second mux signal is in a second logic state, the signal output from the first multiplexor being the clock signal when the first mux signal is in the first logic state, and being the first signal when the first mux signal is in the second logic state.

12. The circuit of claim 11 wherein the slave circuit further comprises a serial-to-parallel shift register connected to the internal circuit, the clock receiver, and the first processing data receiver, the clock signal output by the clock receiver clocking the shift register.

13. The circuit of claim 12 wherein the slave circuit further comprises a parallel-to-serial shift register connected to the internal circuit, the second multiplexor, and the clock receiver, the parallel-to-serial shift register outputting a data output signal in response to a parallel data signal from the internal circuit, the clock signal output by the receiver clocking the parallel-to-serial shift register.

14. The circuit of claim 13 wherein the slave circuit further includes a logic circuit connected to the first mux, the second mux, and the parallel-to-serial shift register, the logic circuit receiving the clock signal from the parallel-to-serial shift register, and setting the logic states of the first and second mux signals in response to commands extracted from the clock signal.

15. A physical layer device connectable to a transmission medium, the device comprising:
    a media driver connectable to the transmission medium;
    a media receiver connectable to the transmission medium;
    a serializer/deserializer (serdes) connected to the media driver and the media receiver, the serdes outputting a master clock signal, an equivalent in-phase slave clock signal when in a calibration mode, and a data signal when in a data mode, the data signal representing a data signal received from the media receiver; and
    a master circuit, the master circuit having:
       a clock driver connected to output the master clock signal as a millivolt differential signal;
       a first physical layer data driver connectable to output the slave clock signal as a millivolt differential signal when the serdes is in the calibration mode, and the data signal as a millivolt differential signal when the serdes is in the data mode.

16. The device of claim 15 wherein the master circuit further includes:

a first physical layer data receiver that receives a signal which represents the master clock signal during a first phase of the calibration mode, and represents the slave clock signal during a second phase of the calibration mode; and an aligner connected to the first physical layer data receiver, the aligner receiving the master clock signal when the first physical layer data receiver receives the master clock signal, and the slave clock signal when the first physical layer data receiver receives the slave clock signal, the aligner having phase comparison circuitry that compares a phase of the master clock signal received by the aligner with a phase of the slave clock signal received by the aligner to determine a phase difference.

17. The device of claim 16 wherein the master circuit further comprises a phase delay circuit connected to the aligner, the serdes, and the first physical layer data driver, the aligner passing a plurality of signals to the phase delay circuit that indicates the phase difference, the phase delay circuit delaying the slave clock signal output from the serdes an amount so that the slave clock signal received by the aligner is substantially in phase with the master clock signal received by the aligner when in the calibration mode, the data signal being delayed the amount when in the data mode.

18. A method for operating a communication device having a physical layer device connected to a transmission medium and a processing device connected to the physical layer device, the method comprising the steps of:

outputting a master clock signal from the physical layer device over a first path;

receiving the master clock signal in the processing device from the first path;

outputting the master clock signal as a feedback master clock signal from the processing device over a feedback path;

receiving the feedback master clock signal in the physical layer device from the feedback path;

determining a phase of the feedback master clock signal;

outputting a slave clock signal from the physical layer device over a second path after the phase of the feedback master clock signal has been determined, the master clock signal and the slave clock signal having an equivalent frequency;

receiving the slave clock signal in the processing device from the second path;

outputting the slave clock signal as a feedback slave clock signal from the processing device over the feedback path;

receiving the feedback slave clock signal in the physical layer device from the feedback path;

determining a phase of the feedback slave clock signal;

comparing the phase of the feedback master clock signal with the phase of the feedback slave clock signal to determine a phase difference; and adjusting a delay so that the phase of the feedback slave clock signal is substantially aligned with the phase of the feedback master clock signal.

19. The method of claim 18 and further comprising the steps of:

outputting a data clock signal from the physical layer device over the first path after the phase difference has been determined;

outputting an input data signal from the physical layer device over the second path after the phase difference has been determined, the input data signal and data clock signal having an equivalent frequency; and converting the input data signal to a parallel word by clocking the input data signal with the data clock signal.

20. A communication device comprising:

a physical layer device connectable to a transmission medium, the device having a master circuit, the master circuit having:

a clock output;

a first data output;

a first data input;

a phase comparator connected to the first data input; and a processing circuit having a slave circuit, the slave circuit having:

a clock input connected to the clock output;

a second data input connected to the first data input;

a second data output connected to the first data input; and a switch for connecting an output signal from the clock input to the second data output, or an output signal from the second data input to the second data output, the phase comparator comparing a phase of the output signal from the clock input with a phase of the output signal from the second data input to determine a phase difference.

* * * * *

UNITED STATES PATENT AND TRADEMARK OFFICE
CERTIFICATE OF CORRECTION

| | |
|---|---|
| PATENT NO. | : 7,039,118 B1 |
| APPLICATION NO. | : 09/761211 |
| DATED | : May 2, 2006 |
| INVENTOR(S) | : Para K. Segaram |

It is certified that error appears in the above-identified patent and that said Letters Patent is hereby corrected as shown below:

Column 2, claim 1, line 28, please delete "a media driver connectable to a transmission medium;"
Column 2, claim 1, line 29, please delete "the" and insert -- a --
Column 2, claim 1, line 31, please delete "media"
Column 2, claim 1, line 32, please delete "driver and the"
Column 2, claim 1, line 45, after "receiving the" please insert -- first differential --

Column 1, claim 4, line 14, after "ing the" please insert -- first differential --

Column 1, claim 5, line 19, please delete "input"
Column 1, claim 5, line 26, please delete "communication" and insert -- processing --

Column 1, claim 6, line 40, after "the" please insert -- serial-to-parallel --

Column 1, claim 7, line 44, after "the" please insert -- parallel-to-serial --

Column 1, claim 8, line 49, please delete "mux" and insert -- multiplexor --
Column 1, claim 8, line 50, please delete "mux" and insert -- multiplexor --

Column 1, claim 9, line 57, please delete "the" and insert -- a --

Column 1, claim 10, line 61, please delete "an internal circuit, and"
Column 1, claim 10, lines 62 and 63, please delete "a slave circuit connected to the internal circuit, the slave circuit having;"
Column 1, claim 10, line 66, please delete "millivolt" and insert -- first --
Column 2, claim 10, line 4, please delete "millivolt" and insert -- second --

Column 2, claim 11, line 11, please delete "slave" and insert -- processing --
Column 2, claim 11, line 13, please delete "input"
Column 2, claim 11, line 21, please delete "communication" and insert -- processing --

Signed and Sealed this
Twenty-fifth Day of October, 2011

David J. Kappos
*Director of the United States Patent and Trademark Office*

CERTIFICATE OF CORRECTION (continued)
U.S. Pat. No. 7,039,118 B1

Column 2, claim 12, line 30, please delete "slave" and insert -- processing --
Column 2, claim 12, line 31, please delete "connected"
Column 2, claim 12, line 32, please delete "to the internal circuit"
Column 2, claim 12, line 34, after "the" please insert -- serial-to-parallel --

Column 2, claim 13, line 35, please delete "slave" and insert -- processing --
Column 2, claim 13, line 36, please delete "connected"
Column 2, claim 13, line 37, please delete "to the internal circuit"
Column 2, claim 13, line 39, please delete "from the"
Column 2, claim 13, line 40, please delete "internal circuit"

Column 2, claim 14, line 42, please delete "slave" and insert -- processing --
Column 2, claim 14, line 43, please delete "includes" and insert -- comprises --
Column 2, claim 14, line 43, please delete "mux" and insert -- multiplexor --
Column 2, claim 14, line 44, please delete "mux" and insert -- multiplexor --

Column 2, claim 15, line 51, please delete "a media driver connectable to the transmission medium;"
Column 2, claim 15, line 53, please delete "media"
Column 2, claim 15, line 54, please delete "driver and the"
Column 2, claim 15, line 63, please delete "millivolt" and insert -- second --

Column 1, claim 18, lines 44-46, please delete ", the master clock signal and the slave clock signal having an equivalent frequency;"